United States Patent
Schulz et al.

(10) Patent No.: US 10,429,833 B2
(45) Date of Patent: Oct. 1, 2019

(54) METHOD AND INDUSTRIAL TRUCK FOR ASCERTAINING AND REPRESENTING THE POSITION OF STORAGE BINS IN A WAREHOUSE

(71) Applicant: Jungheinrich Aktiengesellschaft, Hamburg (DE)

(72) Inventors: Eckhard Schulz, Henstedt-Ulzburg (DE); Jan Kopelke, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 15/820,698

(22) Filed: Nov. 22, 2017

(65) Prior Publication Data

US 2018/0143624 A1    May 24, 2018

(30) Foreign Application Priority Data

Nov. 22, 2016  (DE) .................. 10 2016 122 485

(51) Int. Cl.
*G06K 9/00*  (2006.01)
*G05D 1/00*  (2006.01)
(Continued)

(52) U.S. Cl.
CPC ............ *G05D 1/0011* (2013.01); *B66F 9/063* (2013.01); *B66F 9/0755* (2013.01); *B66F 9/24* (2013.01);
(Continued)

(58) Field of Classification Search
USPC ........ 382/100, 103–104, 106, 143, 154–155, 382/162, 168, 173, 181, 190, 199, 209,
(Continued)

(56) References Cited

U.S. PATENT DOCUMENTS 10,122,995 B2 * 11/2018 Rublee ............... H04N 5/23238
2013/0096735 A1 * 4/2013 Byford ................ G05D 1/0231
701/2

(Continued)

FOREIGN PATENT DOCUMENTS

DE   102013002554 A1   8/2014
EP   2385435 A1   11/2011

OTHER PUBLICATIONS

EP Search Report dated Apr. 11, 2018; EP Application No. 17202817.7; (9 pages).

*Primary Examiner* — Seyed H Azarian
(74) *Attorney, Agent, or Firm* — Barclay Damon LLP

(57) ABSTRACT

A method for determining the position of a plurality of storage bins in a warehouse, comprises the steps of: (i) obtaining image data from at least one lateral 3D camera coupled to an industrial truck having a location system and a direction of travel, the at least one lateral 3D camera oriented transversely to the direction of travel of the industrial truck; (ii) obtaining location information concerning the industrial truck by a location system; (iii) determining position data associated with the plurality of storage bins in a warehouse defining a fixed coordinate system, the position data being determined based on the image data acquired by the at least one lateral 3D camera and the location information of the industrial truck; and (iv) storing the position data of the plurality of storage bins in a database of a computer processing unit.

10 Claims, 2 Drawing Sheets

(51) Int. Cl.
  *G06T 7/73*      (2017.01)
  *H04N 13/282*    (2018.01)
  *B66F 9/06*      (2006.01)
  *B66F 9/075*     (2006.01)
  *B66F 9/24*      (2006.01)
  *G06Q 10/08*     (2012.01)

(52) U.S. Cl.
  CPC ............ *G06Q 10/08* (2013.01); *G06T 7/74* (2017.01); *H04N 13/282* (2018.05); *G06T 2207/10012* (2013.01); *G06T 2207/10028* (2013.01); *G06T 2207/30252* (2013.01)

(58) Field of Classification Search
  USPC ....... 382/214, 224, 254, 276, 285–291, 305, 382/312; 348/46; 700/300; 701/2
  See application file for complete search history.

(56) References Cited

U.S. PATENT DOCUMENTS

| | | | | |
|---|---|---|---|---|
| 2014/0232826 A1* | 8/2014 | Halata | ................. | B66F 9/0755 348/46 |
| 2015/0347840 A1* | 12/2015 | Iida | ..................... | H04N 13/271 382/103 |
| 2016/0090285 A1* | 3/2016 | Svensson | ............. | B66F 9/0755 700/300 |

\* cited by examiner

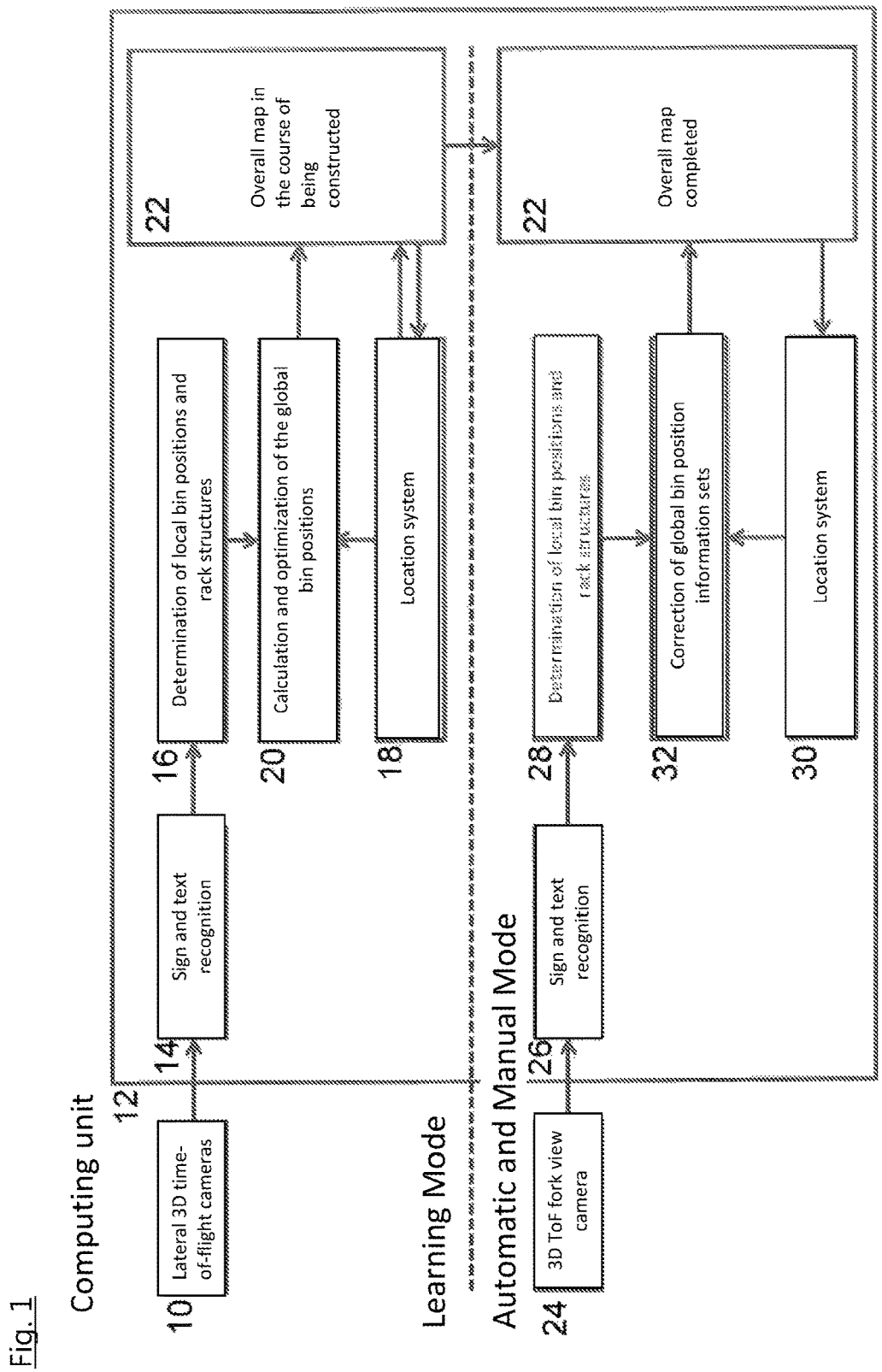

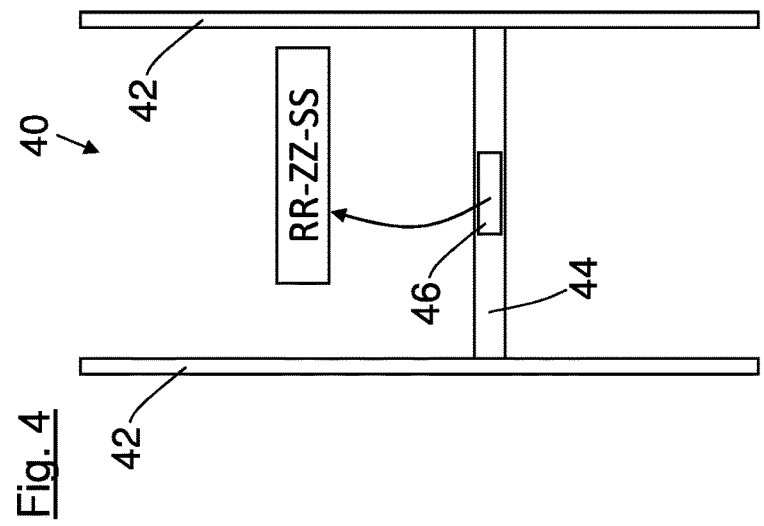
Fig. 4
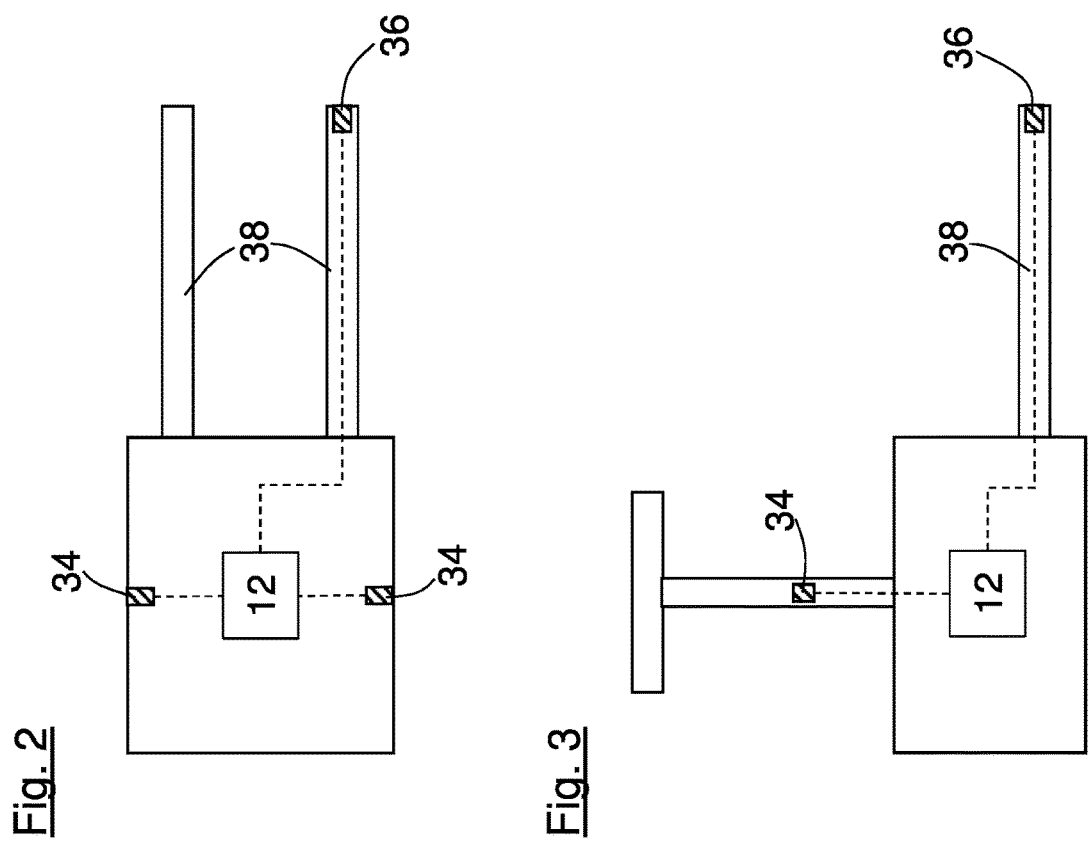
Fig. 2
Fig. 3

METHOD AND INDUSTRIAL TRUCK FOR ASCERTAINING AND REPRESENTING THE POSITION OF STORAGE BINS IN A WAREHOUSE

CROSS REFERENCE TO RELATED INVENTION

This application is based upon and claims priority to, under relevant sections of 35 U.S.C. § 119, German Patent Application No. 10 2016 122 485.5, filed Nov. 22, 2016, the entire contents of which are hereby incorporated by reference.

TECHNICAL FIELD

The invention relates to a method for ascertaining and representing the position of storage bins in a warehouse having a number of predetermined storage bins.

BACKGROUND

When managing a warehouse using industrial trucks, it is useful to determine the exact position of the individual storage bins in the warehouse. As a result, an industrial truck can approach a specific storage location (or can assist an operator) by automatic means. In both cases, it is desirable to have the most accurate information possible about the position of the individual storage bins. Known methods for determining the position of individual storage bins rely on largely manual means of recording of the position, in particular by manually approaching the individual storage bins with the industrial truck. This so-called "teaching" of the position is very laborious, particular in large warehouses having a large number of individual storage bins. Moreover, changes in the configuration of the warehouse, for example, when additional storage bins are added, necessitate additional manual effort. Also, the formerly recorded position of the storage bins may require additional adjustment, or require still further intervention by an operator, respectively.

SUMMARY OF THE INVENTION

Accordingly, in one embodiment of the present invention a method of ascertaining and representing the position of storage bins in a warehouse is provided.

A method is provided for determining the position of a plurality of storage bins in a warehouse, comprises the steps of: (i) obtaining image data from at least one lateral 3D camera coupled to an industrial truck having a location system and a direction of travel, the at least one lateral 3D camera oriented transversely to the direction of travel of the industrial truck; (ii) obtaining location information concerning the industrial truck by a location system; (iii) determining position data associated with the plurality of storage bins in a warehouse defining a fixed coordinate system, the position data being determined based on the image data acquired by the at least one lateral 3D camera and the location information of the industrial truck; and (iv) storing the position data of the plurality of storage bins in a database of a computer processing unit.

Each storage bin in the warehouse has a predetermined position and size. For example, each storage bin may be intended to accommodate a pallet and may have a size suitable for this purpose. The bins have fixed position, e.g. on the floor of a large room and/or in racks of the warehouse. The position of a storage bin may be described by coordinates, in a coordinate system which is fixed in the warehouse. The position information about a storage bin may include a direction in which goods can be stored and retrieved. According to the invention, the position of the individual storage bins may be ascertained and represented by automatically obtaining them and storing them in a database. In this way, the position information may be available at any time for an industrial truck employed in the management of the warehouse. The database may be disposed in a computing unit of the industrial truck itself. However, it is also possible to provide remote access via a radio link to an external database of an all-purpose computer/processing unit.

In the described embodiment, the industrial truck has a main direction of travel and has at least one lateral 3D camera viewing a direction which is oriented transversely to the main direction of travel. The phrase "transversely to the main direction of travel" means that the viewing direction is oriented substantially laterally or orthogonally of the instantaneous direction traveled by the industrial truck. This orientation may be at a right angle to the main direction of travel, or, deviating from that, at a forwardly or rearwardly inclined angle with respect to said main direction of travel. The viewing direction may be oriented horizontally, or, deviating from that, at an upwardly or downwardly inclined angle with respect to the horizontal. Two lateral 3D cameras may be employed on each side of the truck, so that the surroundings on both sides thereof may be recorded simultaneously.

In one method step, image data may be obtained with the at least one lateral 3D camera. The image data may include depth information for each point of the image, so that a spatial image of the surroundings may be recorded. For this purpose, the 3D camera may have, e.g., an image sensor with image points arranged in the form of a matrix for recording depth information for each image point. The image data may be represented as a "point cloud".

In another method step, position information may be determined by means of the location system of the industrial truck. This information relates to the disposition of the industrial truck in the warehouse, and may comprise coordinates of a position of the industrial truck in a coordinate system which is fixed in the warehouse; and, in addition, the information may comprise an indication of the orientation of the industrial truck in three-dimensional space, particularly at an angle relating to the direction of travel. Such positional information may be obtained using various location systems, e.g. based on optical systems which employ fixed predetermined orientation points in the warehouse, or based on continuously acquired information about the movement of the wheels of the industrial truck. A location system which combines these different sources of information may also be used. Notwithstanding, the location system provides information whereby the disposition, or instantaneous position of the industrial truck in the warehouse may be determined with accuracy.

In another method step, the position of individual storage bins are determined in a coordinate system which is fixed in the warehouse. The determination of the storage bin location may be based on the image data and the position information. For this purpose, a storage bin may be detected using methods of image recognition based on image data previously obtained and recorded. The coordinates of this storage bin can first be calculated in a coordinate system based on data obtained by at least one of the lateral 3D cameras of the industrial trucks. By means of a coordinate transformation, they may be then converted into the coordinate system which is fixed in the warehouse. To perform this step, it may be necessary to have the position information about the disposition, or instantaneous position, of the industrial truck in the warehouse at the time that the image data was obtained. The position of the individual storage bins are then stored in a database of a general purpose computer or other computer processing means.

The method may be continued until all of the storage bins in the warehouse have been recorded in the database. In other embodiments, it may be necessary to restrict the recorded information to certain storage bins, e.g. those disposed at a certain rack shelf level, in particular the lowest rack shelf level. The position of the other storage bins can then be added later if necessary or desirable.

Thus, with the aid of the at least one lateral 3D camera, the position of individual storage bins may be determined, in a particularly easy, simple, and substantially automatic manner, without the need for the industrial truck to approach them in proximity for this purpose. Instead, when the image data is obtained, the industrial truck may be located in an arbitrary position in the warehouse, as long as the field of view of the lateral 3D camera may cover or encompass the storage bin. With the aid of the depth information contained in the image data, and the coordinate transformation, it is then possible to determine the position of the storage bin.

In one embodiment, the lateral 3D camera may be a time-of-flight camera. A time-of-flight camera includes a light source and a light sensor, wherein the light source emits modulated, pulsed light, which after reflection from objects in the image field, passes through a light-transmission/admission opening. The pulsed light impinges onto a plurality of image points of the light sensor, which may be arranged in a matrix form and detected. Differences in the transmission time of the light (difference in the "time-of-flight" of the light) are evaluated, so that each image point may be assigned a value for the distance of the object. Since the optical properties of the system are known, the spatial position of an object recorded by each image point can be determined in three dimensional space. Such time-of-flight cameras are commercially available.

In another embodiment, the image data and the position information may be obtained when the industrial truck is passing by one of the storage bins while the vehicle is traveling in its main direction of travel. It is particularly easy and simple to obtain the required data while the vehicle is traveling, because one can record a plurality of storage bins disposed along the path of the vehicle in rapid succession. This makes it possible to record all of the storage bins present in the warehouse (or at a certain rack shelf level), because the industrial truck can pass by all of the rack aisles of the warehouse in a single excursion or pass. Accordingly, the cost and effort for ascertaining and representing the position of the storage bin is reduced substantially, as compared to the manual "teaching" described in the Background section of the invention.

In another embodiment, the storage bins may have signs which bear unique identifiers, which identifiers are read out from the image data which has been obtained. When position information about a storage bin is determined and stored, the associated identifier may be stored along with it. The signs may comprise, e.g., stickers or magnetic signs. The identifier may comprise, e.g., alphanumeric characters, and/or a particularly machine-readable representation, such as a barcode or a QR code. A particularly reliable, and easy-to-use, database is obtained by the automatic recording of the unique identifiers of the storage bins as the method performed.

In another embodiment, in a first optimization step, data about individual position stored in the database at a given time may be optimized, taking into account a rack structure of the warehouse. This step may be performed inasmuch as the individual storage locations determined by the lateral 3D camera may have limited accuracy. The accuracy of the available position can be improved by making adjustments to position information determined for a plurality of storage bins, with "boundary conditions" resulting from the rack structure. For example, it is possible to take into consideration the fact that a plurality of adjacent storage bins in a rack are separated by a common or predetermined distance. In this way, the position of the individual storage bins determined in the first step of the method may be corrected or optimized. The accuracy of the available information may be improved, because deviations in the individual position can be "averaged out".

In another embodiment, the rack structure is determined based on the identifiers of the storage bins, which identifiers have been read out. For example, the identifier of a given storage bin may contain information about whether the bin is assigned to a given rack. If a plurality of storage bins are recorded as being assigned to the same rack, this in turn can be used to improve the accuracy of the determined position, e.g. if one can make certain assumptions concerning the distances between adjacent bins, or if other assumptions can be made that the leading edges of the bins are aligned along a particular plane or a given line. It is also possible to take into account information about the rack structure supplied by an external source, e.g. information specifying predetermined storage bin separation distances in the horizontal and/or vertical direction, or specifying the number of storage bins comprised in a given rack.

In another embodiment design, the rack structure is determined based on previously known distances between bins, and/or on distances between bins which are determined by the industrial truck. To improve accuracy, external data about the rack structure, and/or measurements by the industrial truck itself, can be introduced, e.g., with the aid of the 3D lateral camera. For example, the industrial truck can determine the arrangement of vertical shelf supports while passing by, and, based on the known distances between two adjacent vertical shelf supports, can derive the widths and/or the number of storage bins disposed between said shelf supports.

In another embodiment, a second optimization step may be performed during a storage or retrieval operation. More specifically, image data of a storage bin may be obtained by a front 3D camera which is directed in the main direction of travel. Based on this image data, an associated position about the storage bin may be determined. As a result, the position data about the storage bin, which have been previously stored in the database, may be adjusted or replaced. The front 3D camera may be oriented in the main direction of travel, during storage or retrieval such that the field of vision of this camera optimally covers the given storage bin and y accurate position data can be obtained. On the basis of the image data of this front 3D camera, again taking into account positional information about the industrial truck, it is possible to accurately determine position information about a particular storage bin. The accuracy of the position data may be subsequently stored in the database and substantially improved.

The position data determined by the lateral 3D camera, possibly after going through the described first optimization step, may already be sufficiently accurate for an automatic approach to be implemented. Furthermore, the accuracy of the position data obtained by the second optimization approach may achieve similar accuracy to that achieved by the known methods of manual "teaching". However, to achieve this accuracy, it is unnecessary to perform a costly and time-consuming "teaching" procedure. Rather, the second optimization step can be performed during the standard storage operation which is conducted. That is the second optimization step can be carried out before or after the first optimization step, and/or independently of the first optimization step.

In another embodiment, during a storage or retrieval operation, image data of a storage bin may be obtained by a front 3D camera which is directed in the main direction of travel, and, based on these image data, position information about vertical shelf supports may be obtained and stored in the database. For this purpose, the same front 3D camera can be used as is used for the second optimization step. The position of the vertical shelf supports may be of interest for the automatic management of the warehouse. In particular, they can be used for the described first optimization step, since they can provide information about the rack structure.

The industrial truck is used for managing a warehouse having a plurality of predefined storage bins. The vehicle has a location system, at least one lateral 3D camera with its viewing direction oriented transversely of a main direction of travel, and a computer or computing unit which is operationally coupled to the location system and to the at least one lateral 3D camera. The computing unit is designed to determine data concerning the position of the individual storage bins in a coordinate system which is fixed in the warehouse, based on the image data acquired by the lateral 3D camera and based on the position information provided by the location system, and to store said data in a database. To explain the features and advantages of the industrial truck, reference is also made to the above descriptions of the method, which suffice for this purpose. It should be appreciated that the industrial truck is designed and equipped to perform the method, and may have additional features which stem from the method steps which are described in greater detail in the subsequent paragraphs.

The lateral 3D camera may be disposed, in particular, at the height of a first rack shelf level of the warehouse, e.g. at a height in a range of between about 0.6 meters to about 2.0 meters. In this way the position of the storage bins disposed on the first rack shelf level can be determined with accurately.

In another embodiment, the industrial truck has a front 3D camera with its viewing direction oriented in the main direction of travel. In this regard, reference is again made to the above descriptions relating to the method. The front 3D camera may be disposed, e.g., on a load-bearing portion of the industrial truck, for example, on the tip of a fork member. The front 3D camera may also be a time-of-flight camera.

In another embodiment, the industrial truck may be remotely operated and may be driverless or unmanned. As already mentioned, the method can be carried out fully automatically, with an autonomously driving vehicle, e.g. a driverless transport system or an autonomously operated forklift.

In another embodiment, the computing unit includes a processing unit which is capable of processing program code having appropriate software.

BRIEF DESCRIPTION OF THE DRAWINGS

The invention will be described in more detail herein below, with reference to an exemplary embodiment illustrated in [the] accompanying drawings.

FIG. 1 is a schematic diagram illustrating the method steps of one embodiment;

FIG. 2 is a simplified plan view of an industrial truck useful for performing the method;

FIG. 3 is a simplified lateral view of the industrial truck according to FIG. 2;

FIG. 4 is a schematic view of a rack which bears a storage bin identifier.

DETAILED DESCRIPTION OF THE INVENTION

One portion of FIG. 1, i.e., the portion above the dashed line, illustrates the inventive method for determining the position of the individual storage bins on the basis of the image data acquired by the at least one lateral 3D camera 34 (see FIGS. 2 and 3). In the portion below the dashed line, FIG. 1 illustrates the optimization steps performed based on the image data acquired by a front 3D camera 36 (see FIGS. 2 and 3).

The method begins in step 10 with acquisition of image data by means of at least one lateral 3D camera 34, referred to in FIG. 1 as a "lateral 3D Time of Flight camera". The image data is processed in a computing unit 12, for example in an onboard computer on the industrial truck. For this purpose, in step 14, a unique identifier of a storage location is read by recognizing and reading a sign attached to the storage bin (i.e., using sign and/or text recognition). In step 16, which is also carried out by the computing unit 12, a position of a storage bin is determined on the basis of the acquired image data, as well as an associated rack structure (determination of local storage bin position and rack structures). This is carried out first in a coordinate system related to the at least one lateral 3D camera 34.

In step 18, position information about the industrial truck is determined by means of a location system, Taking into account this position information and the position of the storage location determined in step 16, in step 20 (calculation and optimization of the global storage bin position), the position of the storage bin is determined in a coordinate system which is fixed in the warehouse. Taking into account the rack structures detected in step 16, a first optimization step can also be carried out in step 20.

The position of the storage bin is then stored in a database 22 (the overall map being constructed). In the present example, the database 22 is part of the computing unit 12 of the industrial truck.

All of the steps described thus far serve solely for ascertaining and representing the position of the storage bins, and are carried out when the system is initialized by the industrial truck passing the relevant storage bins. As mentioned, it is possible to pass once through all of the rack aisles in the warehouse, for the described purpose. If corresponding or additional information is available about the rack structure, further storage bins not recorded by the lateral 3D camera 10 can be updated or supplemented in step 20, for example at higher rack levels. After this process, also referred to in FIG. 1 as the "Learning Mode", is completed, the database 22 contains the position of all relevant storage bins.

The other steps, which proceed as illustrated in the lower portion of FIG. 1, can be carried out during the management of the warehouse with the industrial truck. These steps are referred to in FIG. 1 as the "Automatic and Manual Mode". Here, the term "Automatic Mode" means that automatic management of the warehouse is carried out based on the position contained in the database 22. The term "Manual Mode" means that the industrial truck may be controlled by an operator. In the latter circumstance, the steps described below are carried out in the background in order to improve the accuracy of the position contained in the database 22.

For this purpose, in step 24, image data is acquired using a front 3D camera 36, which in the present example is a time-of-flight camera (3D ToF fork view camera), during a storage or retrieval operation. This image data undergoes sign and/or text recognition in the computing unit 12 in step 26, as explained for method step 14. Subsequently, in step 28, the computing unit again determines position data about the relevant storage location and, where needed, information about the rack structure. This corresponds to the method step 16 described above, however, in this step, the image data captured by the 3D front camera 36 is employed.

In step 30, the location system provides position information used in step 32 (correction of global bin position information sets) together with the position information determined in step 28 and, where necessary, information about the rack structure for correcting the previously determined position information about the given bin. The corresponding corrected position information is stored in the database 22 so that complete and exact position of all storage bins (storage locations) become available, step-by-step. This final step is referred to in FIG. 1 as the "Overall map completed".

FIG. 2 shows a plan view of an industrial truck useful for performing the method. A 3D front camera 36 is disposed at the end of one of the two fork members 38, i.e., the load-bearing structure of the truck with the viewing direction of the camera 36 being oriented forwardly along the main direction of travel of the industrial truck. In addition, the industrial truck has two lateral 3D cameras 34, and a computing unit 12 which is operably coupled to the front 3D camera 36 and the two lateral 3D cameras 34.

FIG. 3 shows a lateral view of the industrial truck according to FIG. 2. It is seen that the lateral 3D cameras 34 are disposed at the level of the first shelf in the rack. Their viewing directions are outward, oriented transversely to the main direction of travel.

The shelf 40, shown schematically in FIG. 4, has two vertical shelf supports 42 and a horizontal shelf support 44 disposed therebetween. A storage bin is disposed above the horizontal shelf support 44 and includes a unique identifier. The identifier is displayed on a sign 46 mounted at the horizontal shelf support 44. As shown in FIG. 4 in the enlarged view, the identifier is comprised of a sequence of six alphanumeric characters. The first two alphanumeric characters identify the shelf 40, the third and fourth characters identify the row of the shelf 40 in which the storage bin is disposed, and the last two characters identify the column of the shelf 40 in which the storage bin is disposed.

The invention claimed is:

1. A method for determining the position of a plurality of storage bins in a warehouse, comprising the steps of:
   (i) obtaining image data from at least one lateral 3D camera and at least one front 3D camera each coupled to an industrial truck having a location system and a direction of travel, the at least one lateral 3D camera oriented transversely to the direction of travel of the industrial truck, the at least one front 3D camera being aligned with the direction of travel of the industrial truck;
   (ii) obtaining location information concerning the industrial truck by a location system;
   (iii) determining position data associated with the plurality of storage bins in a warehouse defining a fixed coordinate system, the position data being determined based on the location information of the industrial truck and the image data acquired by one of the at least one lateral 3D camera and the at least one front 3D camera;
   (iv) storing the position data of the plurality of storage bins in a database of a computer processing unit;
   (v) performing a first optimization step wherein the position stored in the database take into account the position of a rack structure of the warehouse, the position of the rack structure is determined based on the unique identifier of each of the plurality the storage bins and on a previously known distance between at least two storage bins in the plurality of storage bins, and,
   (vi) performing a second optimization step wherein the position data associated with at least one of the plurality of storage bins is adjusted based on the image data from the at least one front 3D camera, and wherein the image data of a plurality of storage bins are obtained by a front 3D camera which is directed along the direction of travel, and obtaining and storing position data of a vertical shelf support based on the image data.

2. The method of claim 1 wherein the at least one lateral 3D camera is a time-of-flight camera.

3. The method of claim 1 wherein the image data is obtained while the industrial truck is passing by each of the plurality of storage bins.

4. The method of claim 1 wherein each of the plurality of storage bins have signs bearing a unique identifier, wherein the unique identifiers are read from the obtained image data and wherein the unique identifier is stored along with the position of each of the plurality of storage bins in the database.

5. The method of claim 1 further comprising the step of: performing a first optimization step wherein the position stored in the database at a given time take into account the position of a rack structure of the warehouse.

6. The method of claim 5 wherein the position of the rack structure is determined based on a previously known distance between at least two storage bins in the plurality of storage bins.

7. The method of claim 5 wherein the position of the rack structure is determined based on a distance between at least two storage bins of the plurality of storage bins which distance is determined by the location of the industrial truck.

8. The method of claim 5 wherein during the storage/retrieval operation, image data of a plurality of storage bins are obtained by a front 3D camera which is directed in the direction of travel, and obtaining and storing position data of a vertical shelf support based on the image data.

9. An industrial truck for managing a warehouse having a plurality of storage bins, the industrial truck comprising:
   a location system issuing position signals indicative of the instantaneous position of the industrial truck;
   at least one lateral 3D camera having a viewing direction oriented transversely to a direction of travel of the industrial truck, the at least one 3D camera issuing image signals indicative of image data obtained by the at least one lateral 3D camera regarding the plurality of storage bins;
   at least one front 3D camera having a viewing direction which is aligned with the direction of travel, the at least one front 3D camera issuing image signals indicative of image data obtained by the at least one front 3D camera regarding the plurality of storage bins; and,
   a computing unit operably coupled to the location system, the at least one lateral 3D camera and the at least one front 3D camera;

the computing unit responsive to the position and image signals, for: (i) determining position data regarding each of the plurality the storage bins in a coordinate system fixed in the warehouse, the position data derived from the position and image signals of the location system and one of the at least one lateral 3D camera and the at least one front 3D camera, respectively, (ii) storing the position data in a database, and (iii) performing a first optimization step wherein the position stored in the database take into account the position of a rack structure of the warehouse, the position of the rack structure is determined based on the unique identifier of each of the plurality the storage bins and on a previously known distance between at least two storage bins in the plurality of storage bins, and, (v) performing a second optimization step wherein, the position data of at least one of the plurality of storage bins is adjusted based on the image data obtained by the at least one front 3D camera, and, wherein the image data of a plurality of storage bins are obtained by a front 3D camera which is directed along the direction of travel, and obtaining and storing position data of a vertical shelf support based on the image data.

10. The industrial truck according to claim 9 further comprising a remotely-operated control unit.

* * * * *